G. R. GRADY.
DIRECTION INDICATOR FOR AUTOMOBILES.
APPLICATION FILED SEPT. 2, 1915.
1,290,543. Patented Jan. 7, 1919.
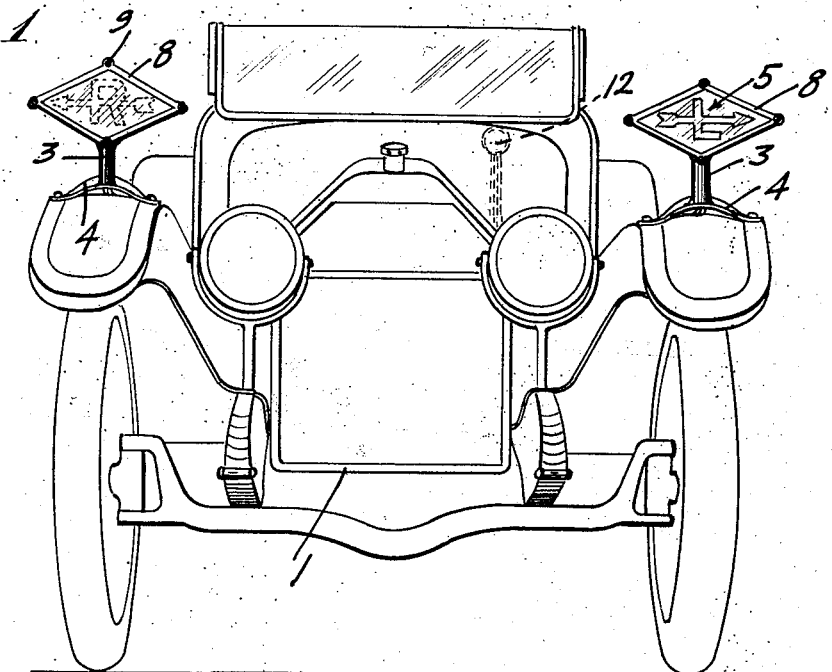
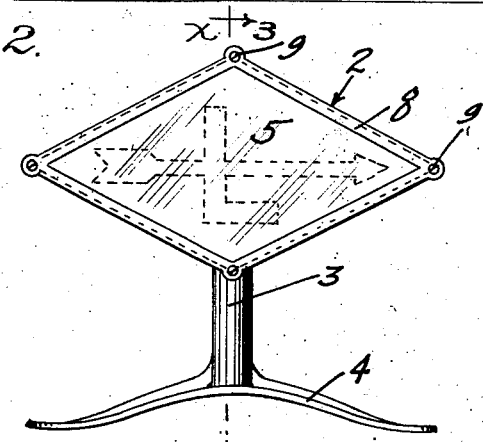
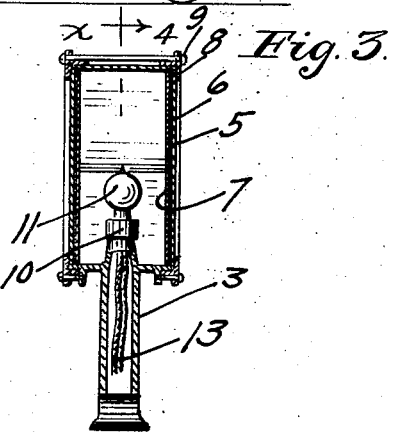
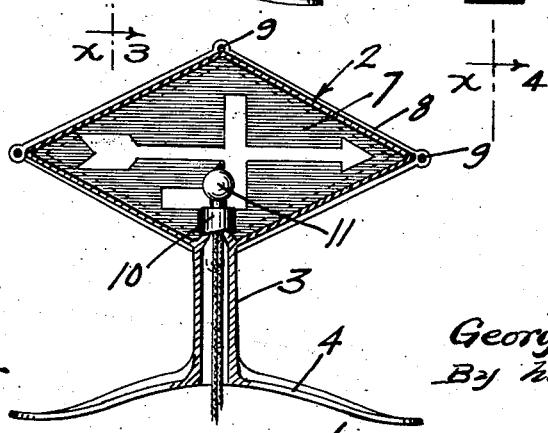
Witnesses
E. C. Skinkle
B. G. Wheeler
Inventor
George R. Grady.
By his Attorneys
Williamson & Merchant

UNITED STATES PATENT OFFICE.

GEORGE R. GRADY, OF MINNEAPOLIS, MINNESOTA, ASSIGNOR OF ONE-HALF TO OLLIE M. WASSING, OF MINNEAPOLIS, MINNESOTA.

DIRECTION-INDICATOR FOR AUTOMOBILES.

1,290,543.   Specification of Letters Patent.   Patented Jan. 7, 1919.

Application filed September 2, 1915. Serial No. 48,654.

*To all whom it may concern:*

Be it known that I, GEORGE R. GRADY, a citizen of the United States, residing at Minneapolis, in the county of Hennepin and State of Minnesota, have invented certain new and useful Improvements in Direction-Indicators for Automobiles; and I do hereby declare the following to be a full, clear, and exact description of the invention, such as will enable others skilled in the art to which it appertains to make and use the same.

My invention has for its object to provide a simple and highly efficient traffic signal or direction indicator for automobiles, and to such ends, generally stated, it consists of the novel devices and combinations of devices hereinafter described and defined in the claims.

Hitherto, a great many different schemes have been proposed, and some actually used for the above generally indicated purpose. In some instances, an illuminated direction indicator has been carried by the machine at a point offset from one side of the body; and in at least one such instance, an illuminated direction indicator thus located has been provided with transparent front and rear walls so that it will be observed both from front and rear of the machine. Such an arrangement, however, is not by any means satisfactory, because it can be observed only from one side of the machine.

In other instances, illuminated signals indicating "right" and "left" have been applied to the front of the machine, and in at least one instance, such indicators have been duplicated both at front and rear of the machine. Such arrangements, however, do not place the indicators in the most conspicuous places, nor do they place them where the right and left direction indicators are remotely separated, so that the very fact that the one or the other is illuminated, by its very location, indicates the direction to be taken by the machine.

I have obtained a most efficient kind of direction indicator or signal by employing two illuminated indicators, the one for indicating "to the right" and the other for indicating "to the left", both having illuminated front and rear faces, and both located offset from the body of the machine, the one at the right, and the other at the left, where the front illuminated faces of both indicators may be seen from the front of the machine, and both illuminated faces of both lamps may be seen from the rear of the machine. Preferably these illuminated indicators are marked with arrows, the one pointing toward the right and the other pointing toward the left, and also with illuminated characters, such as the letters R and L, indicating right and left; but the very fact that, for example, when the left hand indicator is illuminated will, in itself, indicate that the machine is to be turned toward the left. The indicators are illuminated by electric lamps, and for controlling the lamps of the two indicators, I provide a common controller or switch mechanism located within easy reach of the driver. Preferably, these illuminated indicators are applied on the front mud guards where they may be readily observed by traffic officers and others.

In the accompanying drawings which illustrate the invention, like characters indicate like parts throughout the several views.

Referring to the drawings:

Figure 1 is a front elevation showing an automobile with my improved traffic signal, so-called, applied thereto;

Fig. 2 is a front elevation of one of the illuminated indicators;

Fig. 3 is a section taken on the line $x^3$ $x^3$ of Fig. 2; and

Fig. 4 is a section taken on the line $x^4$ $x^4$ of Fig. 3.

In Fig. 1, an ordinary automobile is indicated as an entirety by the numeral 1. Each illuminated indicator, as preferably constructed, has a diamond-shaped metal shell 2 secured on the upper end of a tubular standard 3 having extended feet 4 that are riveted, or otherwise rigidly secured to the front mud guards of the automobile, as clearly shown in Fig. 1. The front and rear faces of both of these indicators have direction indicating characters adapted to be readily seen, either in the day time or at night time, when the respective lamp is in circuit, but not adapted to be seen either in the day time or at night when the respective lamp is cut out of circuit. Preferably, this is accomplished by providing the front and rear face of each shell 2, first with a diamond-shaped ground glass plate 5, then on the inner face of each, a paper sheet 6 with a thin metal plate 7. The metal plates 7, on the left hand side of the machine, have cut therein, outwardly pointing arrows and the letter L, while the metal plates of the right hand indicator have cut therein, outwardly pointing arrows and the letter R. The said plates 5, 6 and 7, as shown, are clamped together and to the respective diamond-shaped shells 2, by angular marginal members 8 and clamping bolts 9.

The upper ends of each tubular standard 3 extends upward into the shells or lamp housings 2 and are provided with lamp sockets 10 into which small electric lamp bulbs 11 are screwed in the usual way.

In Fig. 1, the numeral 12 indicates an electric controller or switch which is connected by wires 13 to the two lamps 11. The switch 12 may be of any of the many well known forms wherein, in one position, it will cut out both lamps, in another position, will cut in only the right hand lamp, and in another position will cut into circuit only the left hand lamp. This switch or controller 12 may be placed on the steering wheel, on the front guard or at any other suitable place within easy reach of the driver or operator of the machine. The operation and advantages of the above described arrangement of the individual right and left direction indicators, both having illuminated front and rear faces, is thought to be made clear from the statements already made.

I found it to be quite a problem to get an arrangement wherein both in the day time and at night, the characters of the illuminated indicator will be visible when the lamp is in circuit but will not be visible when the lamp is out of circuit. I have accomplished this object by the use of ground glass and oiled paper having about the same partial transparency as the ground glass, and combining these with an opaque plate, such as sheet metal having the characters cut therein.

As a further important result obtained from the above described location of the direction indicators, they are so located that the driver can, at all times, observe whether or not the rear, as well as the front illuminated faces of the said indicators are operative, whereas, when the rear indicators are located back of the driver's seat, he cannot tell whether or not the rear signal devices are working without leaving his seat.

What I claim is:

A direction indicator comprising a shell, a standard formed thereon and having a lamp-carrying portion projecting into the shell, a lamp carried by said portion, a transparent facing on each side of the shell, an opaque plate disposed on the inside of each of said facings and having indicating openings formed therein, a translucent material disposed between each of said facings and plates, and flanges secured together by common means for attaching said facings, plates and translucent material to said shell on both sides of the same.

In testimony whereof I affix my signature in presence of two witnesses.

GEORGE R. GRADY.

Witnesses:
HARRY D. KILGORE,
F. D. MERCHANT.